(12) United States Patent
Fukuoka et al.

(10) Patent No.: US 7,809,079 B2
(45) Date of Patent: Oct. 5, 2010

(54) RADIO COMMUNICATION BASE STATION APPARATUS IN MULTIPLE-CARRIER COMMUNICATION AND RADIO COMMUNICATION METHOD

(75) Inventors: Masaru Fukuoka, Ishikawa (JP); Akihiko Nishio, Kanagawa (JP)

(73) Assignee: Panasonic Corporation, Osaka (JP)

( * ) Notice: Subject to any disclaimer, the term of this patent is extended or adjusted under 35 U.S.C. 154(b) by 22 days.

(21) Appl. No.: 12/299,053

(22) PCT Filed: Apr. 27, 2007

(86) PCT No.: PCT/JP2007/059220

§ 371 (c)(1),
(2), (4) Date: Oct. 30, 2008

(87) PCT Pub. No.: WO2007/129621

PCT Pub. Date: Nov. 15, 2007

(65) Prior Publication Data

US 2009/0075700 A1    Mar. 19, 2009

(30) Foreign Application Priority Data

May 2, 2006    (JP) .............................. 2006-128258

(51) Int. Cl.
*H04L 27/00* (2006.01)
(52) U.S. Cl. ...................................... 375/295
(58) Field of Classification Search ................ 375/260, 375/285, 295, 296; 370/208, 210, 203, 343, 370/344
See application file for complete search history.

(56) References Cited

U.S. PATENT DOCUMENTS

| 2004/0190482 A1* | 9/2004 | Baum et al. ................. 370/347 |
| 2005/0100112 A1 | 5/2005 | Yoshida et al. |
| 2006/0120473 A1* | 6/2006 | Baum ......................... 375/260 |

(Continued)

FOREIGN PATENT DOCUMENTS

JP    2002-094483    3/2002

(Continued)

OTHER PUBLICATIONS

International Search Report dated Jul. 31, 2007.

(Continued)

*Primary Examiner*—Tesfaldet Bocure
(74) *Attorney, Agent, or Firm*—Dickinson Wright PLLC (57) ABSTRACT

A base station is provided to suppress a drop of receiving power and deterioration of receiving characteristics by cancellation between the same symbols in the case of application of a repetition technology to multiple-carrier communication. In this base station (100), a repetition unit (103) for reproducing (making repetition of) each data symbol input from a modulating unit (102) to make out a plurality of identical data symbols, and a phase rotating unit (106) for giving a phase rotation to a data symbol input from a multiplexing unit (105). This time the phase rotating unit (106) provides the identical symbols made out by the repetition with the phase rotation which has a phase rotating difference different from phase rotating differences among a plurality of identical symbols transmitted with the ones identical to a plurality of the identical symbols at time and a frequency identical to those of a plurality of the identical symbols in adjacent cells or adjacent sectors.

5 Claims, 12 Drawing Sheets

U.S. PATENT DOCUMENTS

2009/0075700 A1* 3/2009 Fukuoka et al. ............. 455/561

FOREIGN PATENT DOCUMENTS

| JP | 2003-101511 | 4/2003 |
|---|---|---|
| JP | 2003-169382 | 6/2003 |
| JP | 2003-347979 | 12/2003 |
| WO | 2004/049618 | 6/2004 |

OTHER PUBLICATIONS

N. Maeda et al., "Performance Comparisons between OFCDM and OFDM in a Foward Link Broadband Channel," The Institute of Electronics Information and Communications Engineers, Technical Report of IEICE, RCS2002-162, Aug. 2002, pp. 95-100.

* cited by examiner

RADIO COMMUNICATION BASE STATION APPARATUS IN MULTIPLE-CARRIER COMMUNICATION AND RADIO COMMUNICATION METHOD

TECHNICAL FIELD

The present invention relates to a radio communication base station apparatus and radio communication method in multicarrier communication.

BACKGROUND ART

Recently, in radio communication, particularly, in mobile communication, various information such as images and data other than speech are transmission targets. It is anticipated that demands for higher-speed transmission will increase in the future, and a radio transmitting technique for realizing high transmission efficiency utilizing limited frequency resources more efficiently to perform high-speed transmission is demanded.

OFDM is one of radio transmitting techniques to meet these demands. OFDM is a multicarrier transmitting technique for transmitting data in parallel using a plurality of subcarriers, and is known to have features of realizing high frequency efficiency and reducing inter-symbol interference under multipath environment and be effective for improving transmission efficiency.

Further, OFDM provides the maximum frequency efficiency in multicarrier communication because the frequencies of a plurality of subcarriers in which data is arranged are orthogonal to each other, and enables multicarrier communication with a comparatively simple hardware configuration. For this reason, OFDM is focused upon as a communication method to be employed in cellular scheme mobile communication and various studies upon this communication are underway. Further, with OFDM, to prevent inter-symbol interference (ISI), the rear portion of an OFDM symbol is added to the head of the OFDM symbol as a cyclic prefix (CP). Consequently, the receiving end is able to prevent ISI as long as the delay time of the delay wave stays within the time length of the CP (hereinafter simply "CP length").

Furthermore, with OFDM, quality varies significantly between subcarriers due to frequency selective fading resulting from multipath. In this case, given that a signal allocated to a subcarrier in a location which is a valley of fading has poor quality and makes demodulation difficult, it is necessary to improve quality such that demodulation is possible.

There is a repetition technique as a technique for improving quality in OFDM. The repetition technique is directed to performing transmission by generating a plurality of the same symbols by repeating (i.e. repetition) a certain symbol and allocating a plurality of the same symbols to a plurality of different subcarriers or different times, so that the receiving end is able to obtain diversity gain by performing maximum ratio combining of these same symbols (see, for example, Non-Patent Document 1).

On the other hand, transmission diversity techniques which are effective to reduce inter-cell interference include a technique of transmitting the same symbol at the same time, by the same frequency, from the radio communication base station apparatuses (hereinafter "base stations") of a plurality of cells. As a result of such transmission, a radio communication mobile station apparatus (hereinafter "mobile station") located near the cell edge receives mixed same symbols from a plurality of base stations. Consequently, in cases where OFDM is applied to this transmission diversity technique, in the mobile station located near the cell edge, inter-cell interference is not produced as long as a plurality of the same OFDM symbols transmitted from a plurality of base stations at the same time are received with a time lag within the range of the CP length, and these OFDM symbols are combined and received as OFDM symbols with amplified transmission power, so that it is possible to obtain diversity gain.

Non-Patent Document 1: "Performance Comparisons between OFCDM and OFDM in a Forward Link Broadband Channel," Noriyuki MAEDA, Hiroyuki ATARASHI, Yoshihisa KISHIYAMA, Mamoru SAWAHASHI, The Institute of Electronics, Information and Communication Engineers, TECHNICAL REPORT OF ISICE, RCS2002-162, August 2002, pp. 95 to 100

DISCLOSURE OF INVENTION

Problems to be Solved by the Invention

A case will be described here where radio communication that combines the above techniques is performed in the mobile communication system shown in FIG. 1. That is, in this mobile communication system, the base station in cell A ($BS_A$) and the base station in cell B ($BS_B$) both transmit the same OFDM symbols (OFDM symbol A and OFDM symbol B) comprised of subcarriers of the same frequency, to a mobile station (MS) at the same time. OFDM symbol A and OFDM symbol B are each formed with subcarriers $f_1$ to $f_4$ as shown in FIG. 2. Further, in base station $BS_A$ and base station $BS_B$, the same data symbols $S_1$ and $S_1'$ ($S_1'$ is a data symbol which is generated by repeating $S_1$ and which is the same as $S_1$; the same applies below) are allocated to subcarriers $f_1$ and $f_3$, and the same data symbols $S_2$ and $S_2'$ are allocated to subcarriers $f_2$ and $f_4$.

Figure 3:
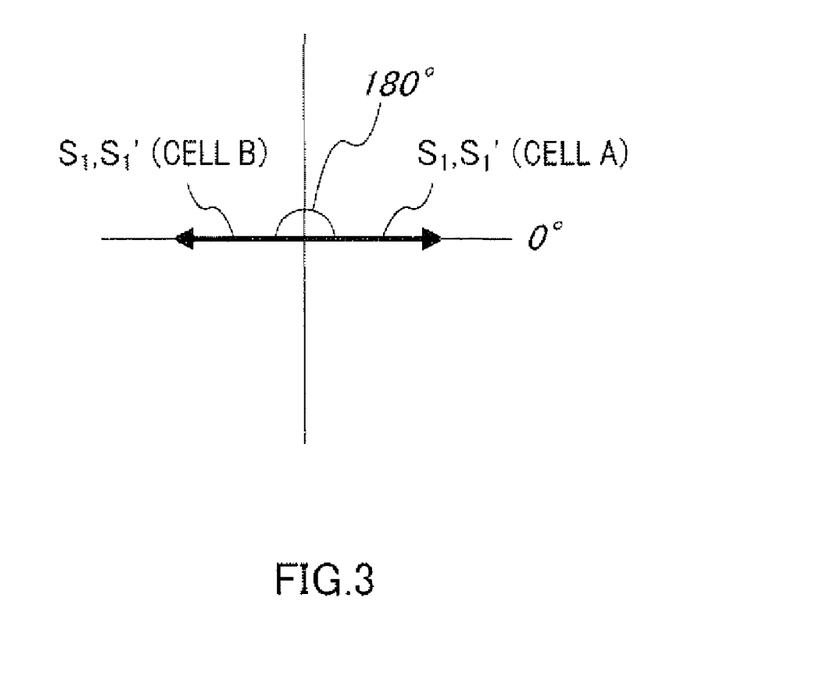
FIG. 3 shows a data symbol influenced by channel variation.

In this case, as shown in FIG. 3, if $S_1$ and $S_1'$ in cell A and $S_1$ and $S_1'$ in cell B are each received in the mobile station with out of phase due to the influence of channel variation in the channels, given that $S_1$s cancel each other and $S_1'$s cancel each other, the received power of both $S_1$ and $S_1'$ decrease significantly and diversity gain resulting from combination of $S_1$ and $S_1'$ cannot be obtained, which results in degradation of received performances. Further, FIG. 3 shows a case where the phases of $S_1$ and $S_1'$ in cell B rotate 180 degrees in the channels.

It is therefore an object of the present invention to provide a base station and radio communication method that, in cases where the repetition technique is employed in multicarrier communication, make it possible to prevent reduction in received power resulting from cancellation between the same symbols and prevent degradation of received performances.

Means for Solving the Problem

The base station according to the present invention that transmits a multicarrier signal comprised of a plurality of subcarriers to a radio communication mobile station apparatus, includes: a repetition section that repeats a first symbol to generate a plurality of same first symbols; a phase rotation section that applies a phase rotation to the plurality of first symbols; and a transmitting section that transmits the multicarrier signal in which the plurality of first symbols given phase rotations are allocated to the plurality of subcarriers, and employs a configuration in which the phase rotation section makes a phase rotation difference produced between the plurality of first symbols different from a phase rotation difference produced between a plurality of second symbols which are the same as the plurality of first symbols and which are transmitted in adjacent cells or adjacent sectors at the same time, by the same frequency, as the plurality of first symbols.

ADVANTAGEOUS EFFECT OF THE INVENTION

The present invention makes it possible to prevent reduction in received power resulting from cancellation between the same symbols and prevent degradation of received performances in cases where the repetition technique is employed in multicarrier communication.

BRIEF DESCRIPTION OF DRAWINGS

FIG. 3 illustrates phase rotation according to an embodiment of the present invention (cell A);

BEST MODE FOR CARRYING OUT THE INVENTION

An embodiment of the present invention will be described in detail below with reference to the drawings.

With the present embodiment, the base station applies phase rotations to a plurality of the same symbols generated by repetition such that the phase rotation differences produced between a plurality of the same symbols are different from the phase rotation differences produced between a plurality of the same symbols transmitted in adjacent cells or adjacent sectors at the same time, by the same frequency as a plurality of the same symbols generated by repetition.

Figure 4:
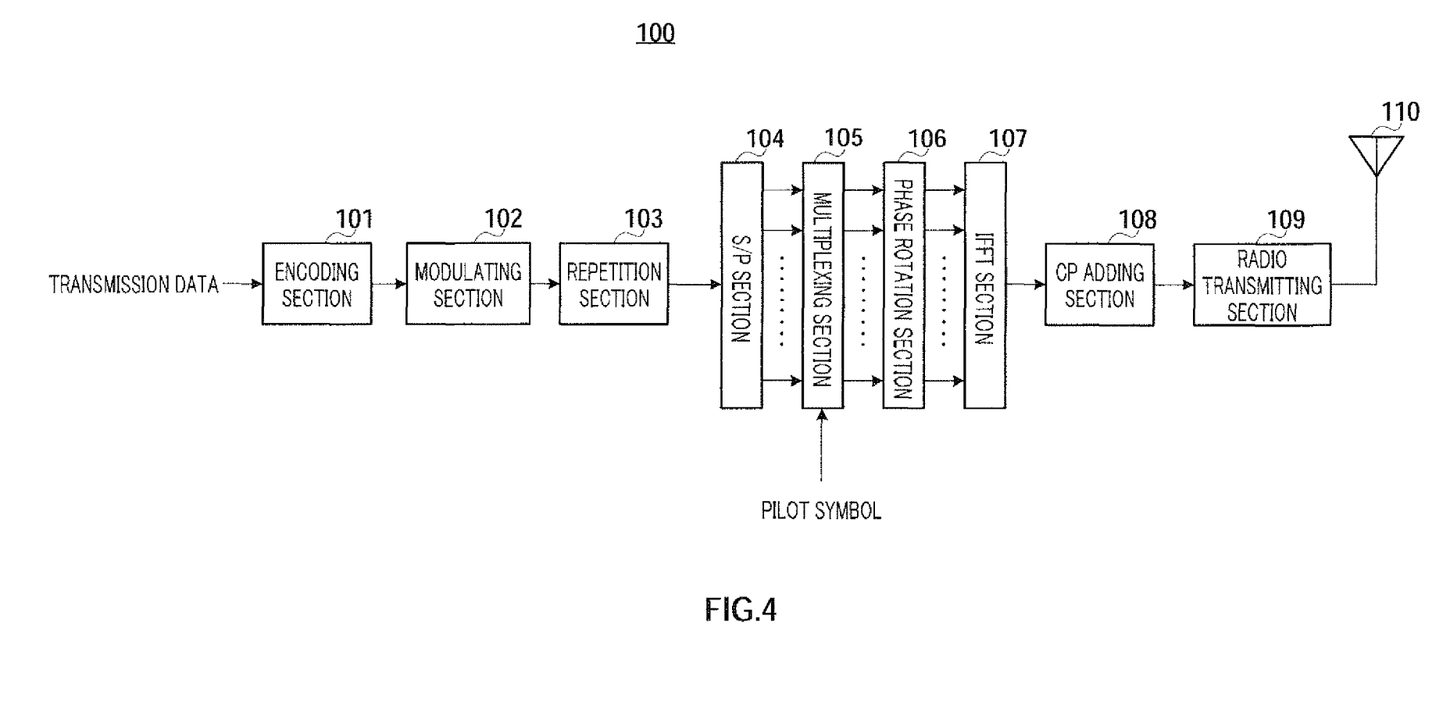
FIG. 4 is a block diagram showing a configuration of a base station according to an embodiment of the present invention.

FIG. 4 shows a configuration of base station 100 according to the present embodiment. With the present embodiment, base station $BS_A$ and base station $BS_B$ shown in FIG. 1 both employ a configuration shown in FIG. 4.

In base station 100, encoding section 101 carries out encoding processing of inputted transmission data (bit sequence), and modulating section 102 generates a data symbol by carrying out modulation processing of the encoded transmission data by the modulation scheme such as QPSK and 16QAM.

Repetition section 103 generates a plurality of the same data symbols by repeating (i.e. repetition) each data symbol inputted from modulating section 102, and outputs a plurality of the same data symbols to S/P section (serial-to-parallel converting section) 104. In the following description, a plurality of the same data symbols will be referred to as the "unit of repetition."

S/P section 104 converts, into parallel, the data symbol sequence inputted from repetition section 103 in a series, and outputs the data symbol sequence to multiplexing section 105. By means of this serial-to-parallel conversion, each data symbol is allocated to a plurality of subcarriers forming a multicarrier signal.

Multiplexing section 105 time-domain-multiplexes the data symbols and the pilot symbols by selecting and outputting a pilot symbol each time a predetermined number of data symbols (for example, one frame of data symbols) are inputted from S/P section 104.

Phase rotation section 106 applies phase rotations to the data symbols inputted from multiplexing section 105. The phase rotation will be described in detail later. The data symbols given phase rotations are outputted to IFFT (Inverse Fast Fourier Transform) section 107.

IFFT section 107 performs an IFFT of a plurality of subcarriers to which the pilot symbols or data symbols are allocated, to acquire an OFDM symbol which is a multicarrier signal.

CP adding section 108 provides a CP by adding the same signal as the rear portion of an OFDM symbol, to the head of the OFDM symbol.

Figure 5:
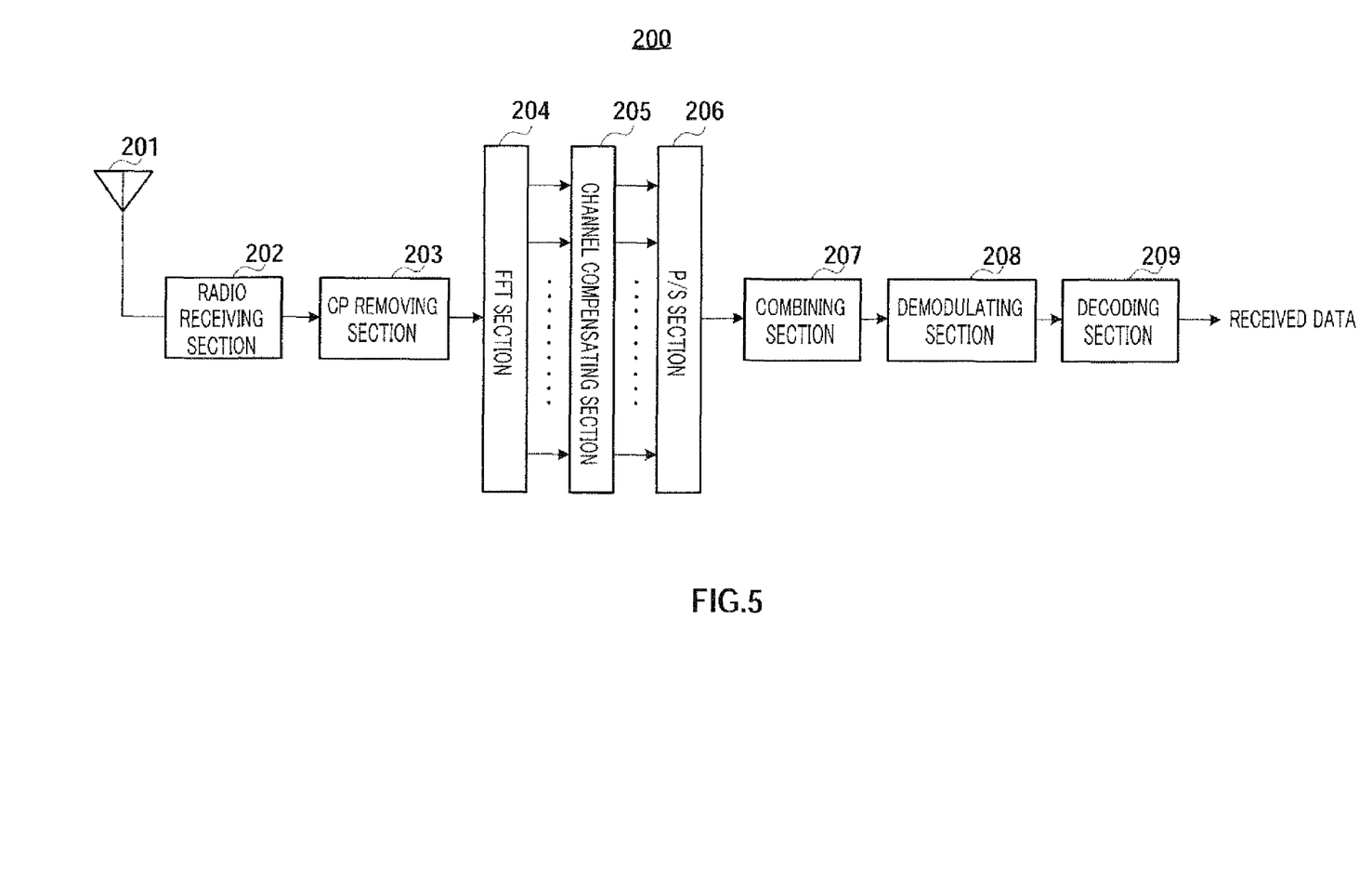
FIG. 5 is a block diagram showing a configuration of a mobile station according to an embodiment of the present invention.

Radio transmitting section 109 carries out transmission processing such as D/A conversion, amplification and up-conversion of the OFDM symbol after the CP is added, and transmits the result to the mobile station shown in FIG. 5 from antenna 110.

Next, FIG. 5 shows a configuration of mobile station 200 according to the present embodiment. Mobile station MS shown in FIG. 1 employs the configuration shown in FIG. 5.

In mobile station 200, the OFDM symbol received through antenna 201 is subjected to reception processing such as down-conversion and A/D conversion in radio receiving section 202, is removed the CP in CP removing section 203 and is inputted to FFT (Fast Fourier Transform) section 204.

FFT section 204 extracts the symbol allocated to each subcarrier by performing an FFT of the OFDM symbol, and outputs one OFDM symbol to channel compensating section 205.

Channel compensating section 205 calculates a channel estimation value of each subcarrier by performing channel estimation using the received pilot symbol, and compensates for the channel variation of the data symbols based on this channel estimation value. In this case, channel compensating section 205 calculates a channel compensation value taking into account the phase rotation applied in base station 100. One OFDM symbol of the data symbols after channel variation compensation is outputted in parallel, to P/S section 206.

P/S section 206 converts the data symbol sequences inputted in parallel from channel compensating section 205 into a series, and outputs the result to combining section 207.

Combining section 207 combines the data symbols in repetition units, that is, between the same data symbols generated by repetition in base station 100.

Further, the operations of channel compensating section 205 and combining section 207 will be described in detail.

The combined symbol is demodulated in demodulating section 208 and is decoded in decoding section 209. By this means, received data can be obtained.

Next, the phase rotation applied in phase rotation section 106 of base station 100 and the operations of channel compensating section 205 and combining section 207 of mobile station 200 will be described in detail.

Figure 1:
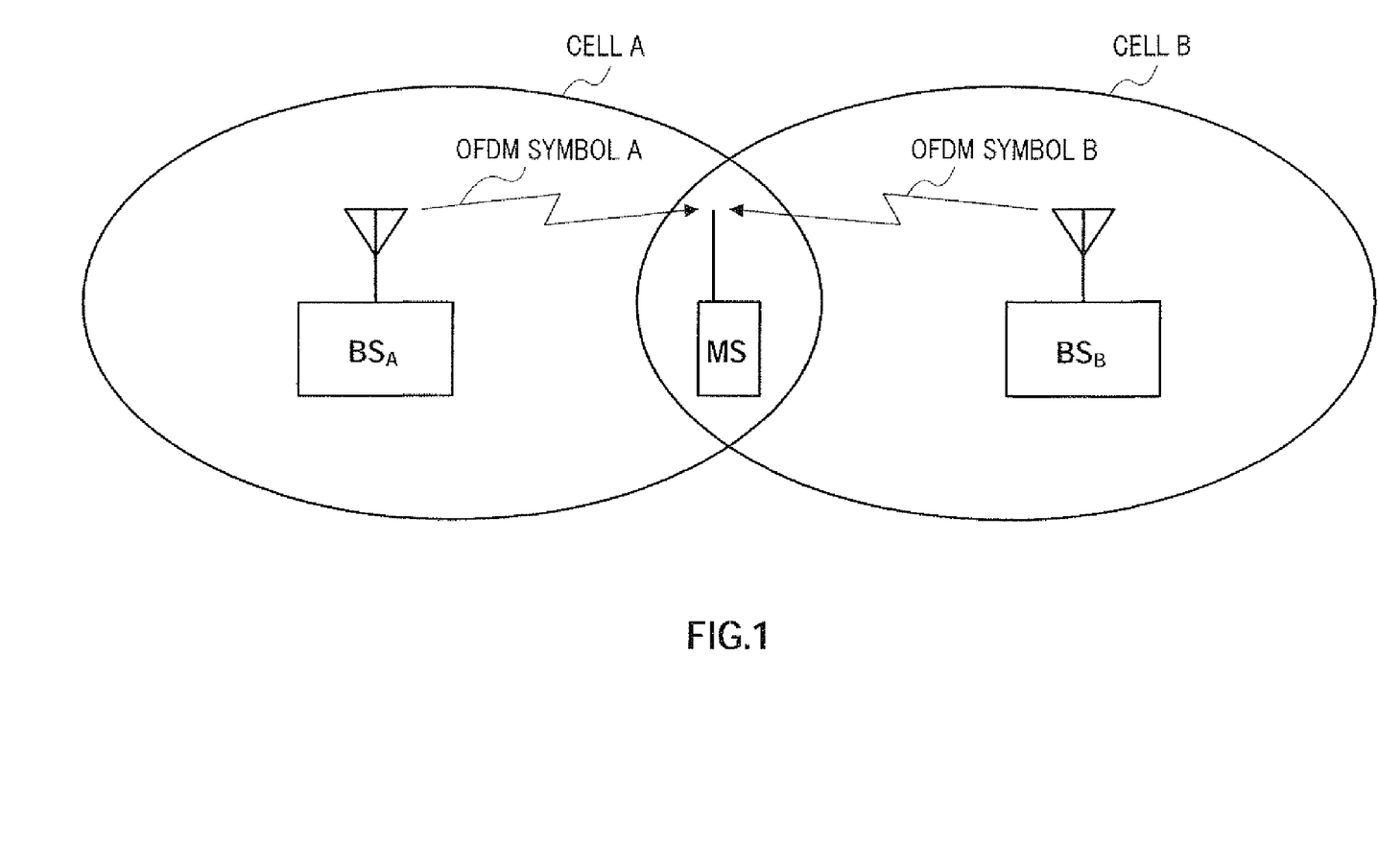
FIG. 1 shows cell arrangement of a two-cell model.
Figure 2:
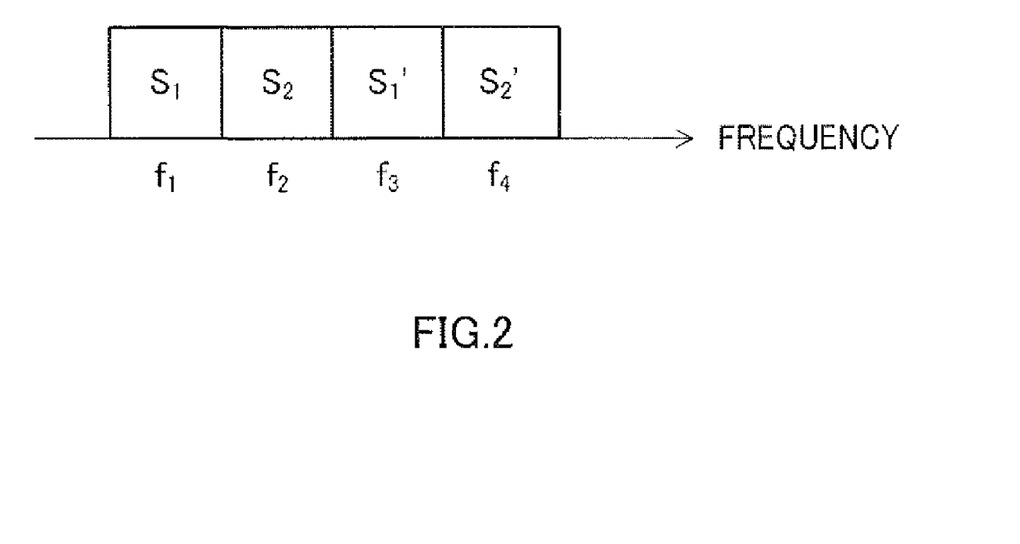
FIG. 2 shows a data symbol after repetition.

First, a case will be described where there is one cell, cell B, adjacent to cell A, as shown in FIG. 1. In the following description, as described above, OFDM symbol A and OFDM symbol B are each formed with subcarriers $f_1$ to $f_4$. Further, in the base station in cell A ($BS_A$) and the base station in cell B ($BS_B$), the same data symbols $S_1$ and $S_1'$ are allocated to subcarriers $f_1$ and $f_3$, and the same data symbols $S_2$ and $S_2'$ are allocated to subcarriers $f_2$ and $f_4$. Then, base station $BS_A$ and base station $BS_B$ both transmit the same OFDM symbols (OFDM symbol A and OFDM symbol B) comprised of subcarriers of the same frequency to a mobile station (MS) at the same time. Further, although the following description focuses upon data symbol $S_1$ and $S_1'$, as to data symbols $S_2$ and $S_2'$, the present invention can be implemented in the same way.

Figure 6:
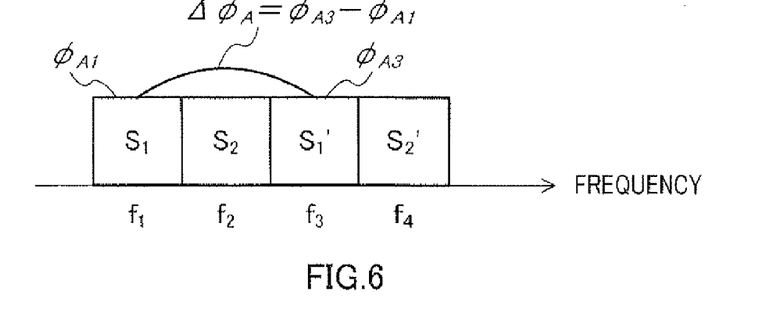
FIG. 6 illustrates phase rotation according to an embodiment of the present invention (cell A)

As shown in FIG. 6, base station $BS_A$ applies phase rotations of phase rotation angles $\phi_{A1}$ and $\phi_{A3}$ to the same data symbols $S_1$ and $S_1'$. In this way, the phase rotation difference between $S_1$ and $S_1'$ in cell A is $\Delta\phi_A=\phi_{A3}-\phi_{A1}$.

Figure 7:
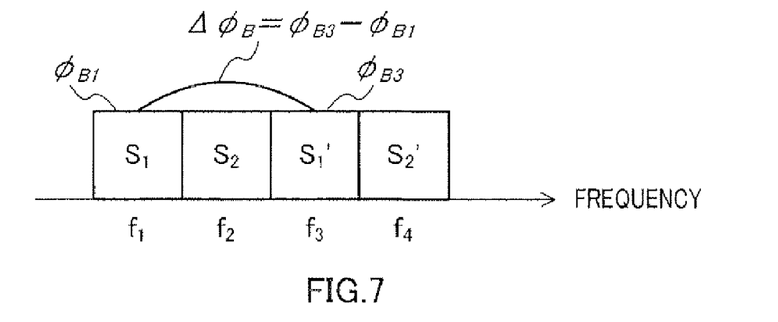
FIG. 7 illustrates phase rotation according to an embodiment of the present invention (cell B)

On the other hand, as shown in FIG. 7, base station $BS_B$ applies phase rotations of phase rotation angles $\phi_{B1}$ and $\phi_{B3}$, to the same data symbols $S_1$ and $S_1'$. In this way, the phase rotation difference between $S_1$ and $S_1'$ in cell B is $\Delta\phi_B=\phi_{B3}-\phi_{B1}$.

Further, with the present invention, $\Delta\phi_A \neq \Delta\phi_B$. That is, with the present invention, the phase rotation difference $\Delta\phi_A$ between the data symbols $S_1$ and $S_1'$ in cell A and the phase rotation difference $\Delta\phi_B$ between the data symbols $S_1$ and $S_1'$ in cell B, adjacent to cell A, are different.

Figure 8:
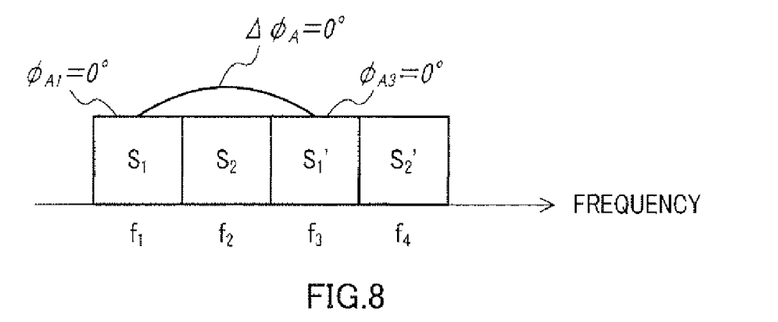
Figure 9:
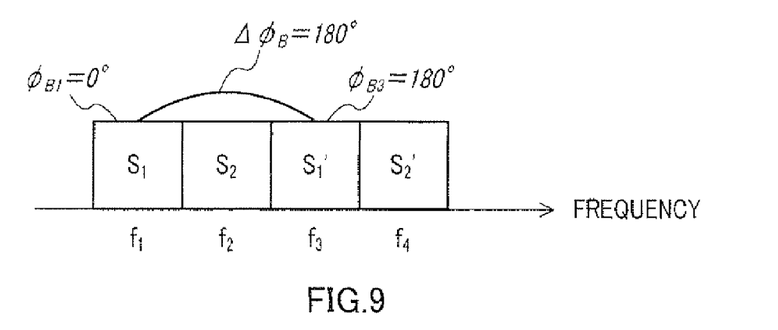
FIG. 9 illustrates phase rotation according to an embodiment of the present invention (cell B)
Figure 10:
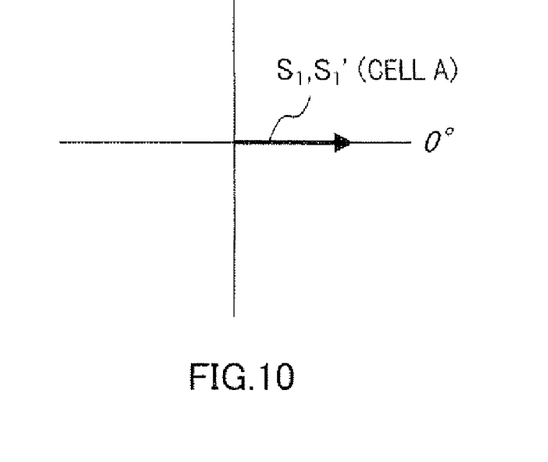
FIG. 10 shows a data symbol according to an embodiment of the present invention (cell A)
Figure 11:
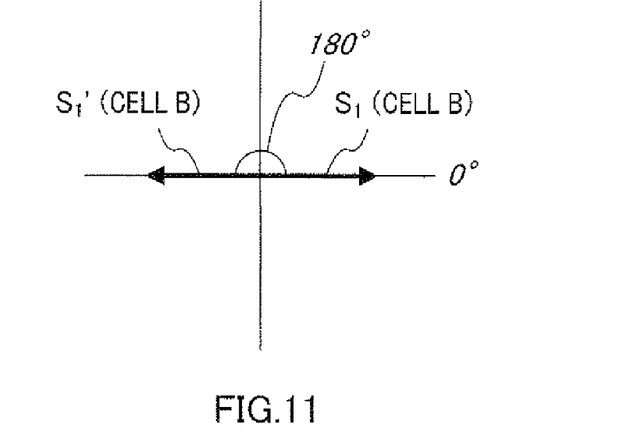
FIG. 11 shows a data symbol according to an embodiment of the present invention (cell B)

For example, as shown in FIG. 8 and FIG. 9, $\Delta\phi_A=0$ degree assuming that $\phi_{A1}=0$ degree and $\phi_{A3}=0$ degree, and $\Delta\phi_B=180$ degrees assuming that $\phi_{B1}=0$ degree and $\phi_{B3}=180$ degrees. In this way, $S_1$ and $S_1'$ included in OFDM symbol A transmitted from base station $BS_A$ in cell A are as shown in FIG. 10, and $S_1$ and $S_1'$ included in OFDM symbol B transmitted from base station $BS_B$ in cell B are as shown in FIG. 11. OFDM symbol A and OFDM symbol B including $S_1$ and $S_1'$, to which such phase rotations are applied, are received by mobile station MS.

Figure 12:
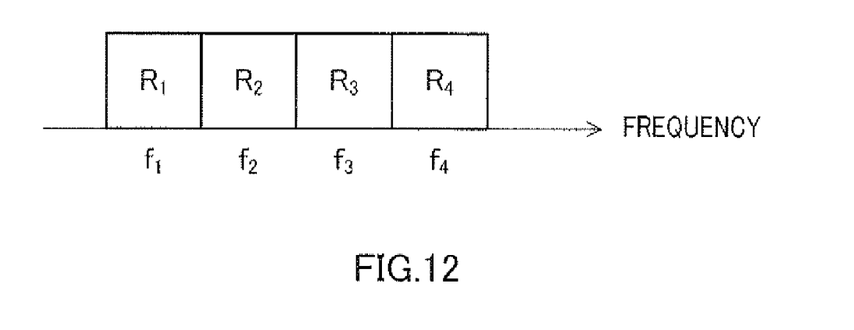
FIG. 12 shows a received symbol according to an embodiment of the present invention.

FIG. 12 shows the received symbol in mobile station MS. Data symbols received by means of subcarriers $f_1$ and $f_4$ are data symbols $R_1$ to $R_4$. $R_1$ and $R_3$ received by means of subcarriers $f_1$ and $f_3$ to which $S_1$ and $S_1'$ are allocated, will be focused upon and described. Further, in the following description, the channel variation in subcarrier $f_1$ in cell A is $h_{A1}$, the channel variation in subcarrier $f_3$ in cell A is $h_{A3}$, the channel variation in subcarrier $f_1$ in cell B is $h_{B1}$ and the channel variation in subcarrier $f_3$ in cell B is $h_{B3}$. Furthermore, assuming that the frequency interval between subcarriers $f_1$ and $f_3$ is narrow and these subcarriers stay in the coherent bandwidth, frequency performances in the channels are uniform between subcarriers $f_1$ and $f_3$, so that $h_{A1}=h_{A3}$ and $h_{B1}=h_{B3}$. Still further, assuming that subcarriers $f_1$ and $f_3$ stay in the coherent bandwidth, $\Delta\phi_A$ applied in base station $BS_A$ and $\Delta\phi_B$ applied in base station $BS_B$ are maintained as is until $\Delta\phi_A$ and $\Delta\phi_B$ reach to mobile station MS.

Three cases of (1) $h_{A1}=h_{A3}=90$ degrees and $h_{B1}=h_{B3}=180$ degrees, (2) $h_{A1}=h_{A3}=90$ degrees and $h_{B1}=h_{B3}=270$ degrees, and (3) $h_{A1}=h_{A3}=45$ degrees and $h_{B1}=h_{B3}=90$ degrees, will be assumed and described below.

(1) Case of $h_{A1}=h_{A3}=90$ degrees and $h_{B1}=h_{B3}=180$ degrees (FIG. 13A to H)

Figure 13A:
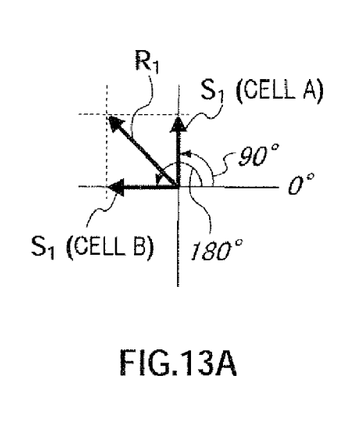
FIG. 13 shows a received symbol according to an embodiment of the present invention.

Given that $h_{A1}=90$ degrees and $h_{B1}=180$ degrees, the phase of $S_1$ in cell A (FIG. 10) rotates 90 degrees in the channel and the phase of $S_1$ in cell B (FIG. 11) rotates 180 degrees in the channel. In this way, $S_1$ in cell A and $S_1$ in cell B are combined in channels, so that received symbol $R_1$ is as shown in FIG. 13A.

Figure 13B:
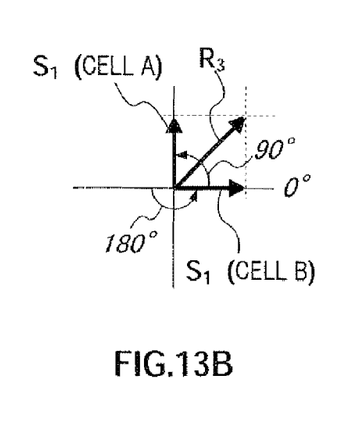

Given that $h_{A3}=90$ degrees and $h_{B3}=180$ degrees, the phase of $S_1'$ in cell A (FIG. 10) rotates 90 degrees in the channel and the phase of $S_1'$ in cell B (FIG. 11) rotates 180 degrees in the channel. In this way, $S_1'$ in cell A and $S_1'$ in cell B are combined in the channels, so that received symbol $R_3$ is as shown in FIG. 13B.

Figure 13C:
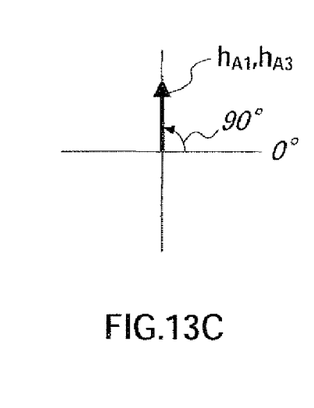
Figure 13D:
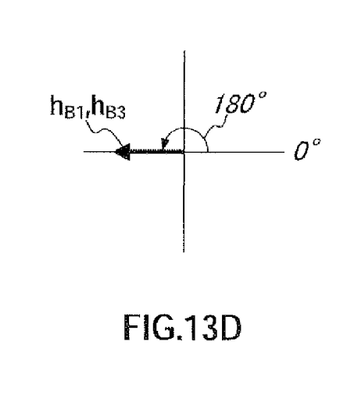

On the other hand, channel estimation values resulting from channel estimation in channel compensating section 205 are $h_{A1}=h_{A3}=90$ degrees and $h_{B1}=h_{B3}=180$ degrees as shown in FIG. 13C and FIG. 13D.

Figure 13E:
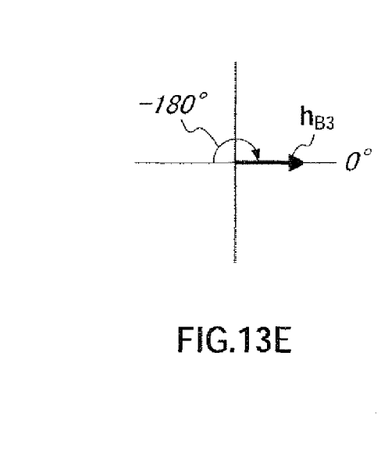

According to $\phi_{B3}=180$ degrees, channel compensating section 205 carries out processing to reverse the phase of $h_{B3}$ in FIG. 13D 180 degrees as shown in FIG. 13E. This processing makes $h_{B3}=0$ degree.

Figures 13F, 13G:
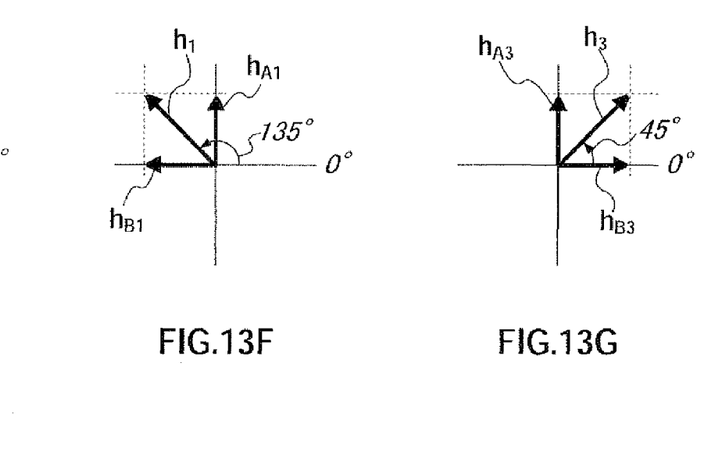

Next, channel compensating section 205 finds combined channel estimation value $h_1$ in subcarrier $f_1$ by combining $h_{A1}$ and $h_{B1}$ as shown in FIG. 13F, to find the channel estimation value for $R_1$ obtained by combining $S_1$ in cell A and $S_1$ in cell B. In this way, $h_1=135$ degrees. In the same way, channel compensating section 205 finds combined channel estimation value $h_3$ in subcarrier $f_3$ by combining $h_{A3}$ and $h_{B3}$ after the phase is reversed, as shown in FIG. 13G, to find the channel estimation value for $R_3$ obtained by combining $S_1'$ in cell A and $S_1'$ in cell B. In this way, $h_3=45$ degrees.

Figure 13H:
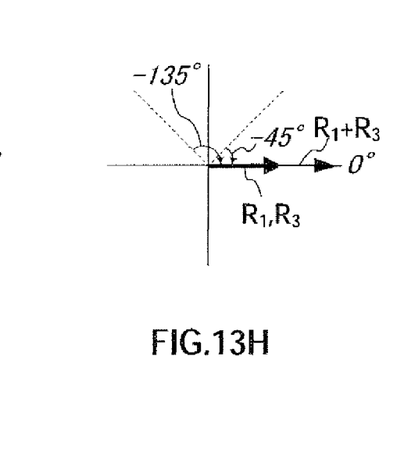

Next, as shown in FIG. 13H, channel compensating section 205 compensates for the channel variation in $R_1$ based on $h_1$ and compensates for the channel variation in $R_3$ based on $h_3$. That is, channel compensating section 205 carries out processing to reverse the phase of $R_1$ 135 degrees and the phase of $R_3$ 45 degrees.

Then, as shown in FIG. 13H, combining section 207 combines $R_1$ and $R_3$ after compensation for channel variation and acquires the combined symbol $R_1+R_3$.

In this way, $\Delta\phi_A=0$ degree and $\Delta\phi_B=180$ degrees, so that it is possible to prevent $S_1$ and $S_1'$ in cell A and $S_1$ and $S_1'$ in cell B from being received by mobile station MS with out of phase.

(2) Case of $h_{A1}=h_{A3}=90$ degrees and $h_{B1}=h_{B3}=270$ degrees (FIG. 14A to H)

Figure 14A:
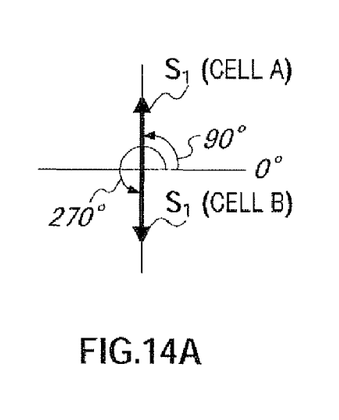
FIG. 14 shows a received symbol according to an embodiment of the present invention.

Given that $h_{A1}=90$ degrees and $h_{B1}=270$ degrees, the phase of $S_1$ in cell A (FIG. 10) rotates 90 degrees in the channel, and the phase of $S_1$ in cell B (FIG. 11) rotates 270 degrees in the channel. In this way, $S_1$ in cell A and $S_1$ in cell B are combined in the channels, so that received symbol $R_1$ is zero as shown in FIG. 14A.

Further, given that $h_{A3}$=90 degrees and $h_{B3}$=270 degrees, the phase of $S_1$' in cell A (FIG. 10) rotates 90 degrees in the channel, and the phase of $S_1$' in Cell B (FIG. 11) rotates 270 degrees in the channel. In this way, $S_1$' in cell A and $S_1$' in cell B are combined in the channels, so that received symbol $R_3$ is as shown in FIG. 14B.

Figures 14B, 14C:
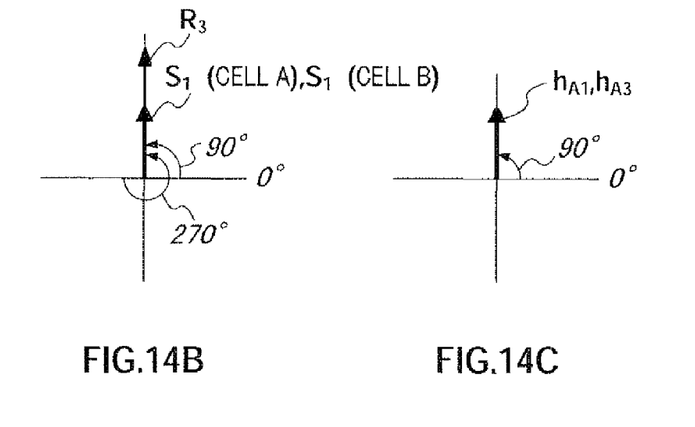
Figure 14D:
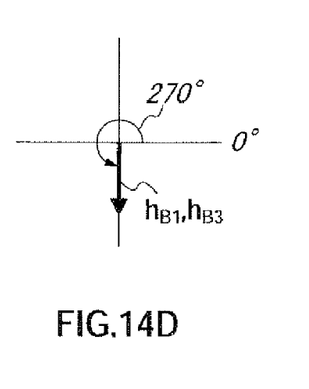

On the other hand, channel estimation values resulting from channel estimation in channel compensating section 205 are $h_{A1}$=$h_{A3}$=90 degrees and $h_{B1}$=$h_{B3}$=270 degrees as shown in FIGS. 14C and D.

Figure 14E:
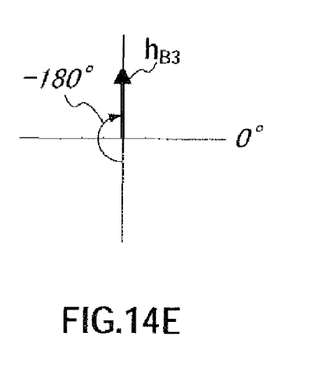

According to $\phi_{B3}$=180 degrees, channel compensating section 205 carries out processing to reverse the phase of $h_{B3}$ in FIG. 14D 180 degrees as shown in FIG. 14E. This processing makes $h_{B3}$=90 degrees.

Figure 14F:
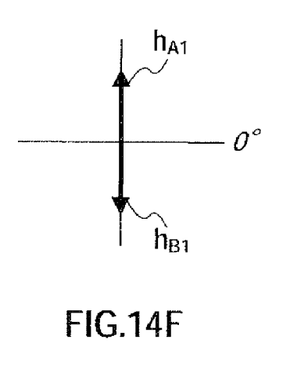
Figure 14G:
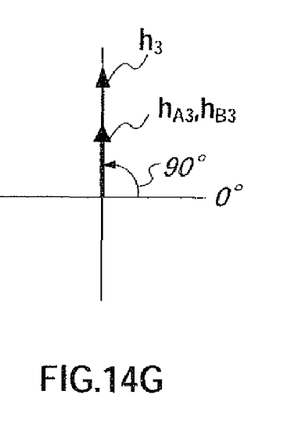

Next, channel compensating section 205 finds combined channel estimation value $h_1$ in subcarrier $f_1$ by combining $h_{A1}$ and $h_{B1}$ as shown in FIG. 14F, to find the channel estimation value for $R_1$ obtained by combining $S_1$ in cell A and $S_1$ in cell B. In this way, $h_1$=zero. In the same way, channel compensating section 205 finds combined channel estimation value $h_3$ in subcarrier $f_3$ by combining $h_{A3}$ and $h_{B3}$ after the phase is reversed, as shown in FIG. 14G, to find the channel estimation value for $R_3$ obtained by combining $S_1$' in cell A and $S_1$' in cell B. In this way, $h_3$=90 degrees.

Figure 14H:
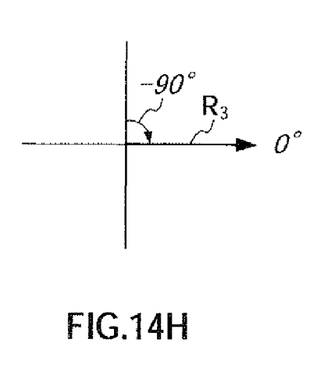

Next, as shown in FIG. 14H, channel compensating section 205 compensates for the channel variation in $R_1$ based on $h_1$ and compensates for the channel variation in $R_3$ based on $h_3$. In this case, given that $R_1$ is zero, channel compensating section 205 carries out only processing to reverse the phase of $R_3$ 90 degrees.

Then, as shown in FIG. 14H, combining section 207 combines $R_1$ and $R_3$ after compensation for channel variation and acquires the combined symbol $R_1$+$R_3$. Given that $R_1$ is zero, $R_3$ can be obtained as the combined symbol.

In this way, $\Delta\phi_A$=0 degree and $\Delta\phi_B$=180 degrees, so that it is possible to prevent $S_1$ and $S_1$' in cell A and $S_1$ and $S_1$' in cell B from being received by mobile station MS with out of phase, as in case of above (1).

(3) Case of $h_{A1}$=$h_{A3}$=45 degrees and $h_{B1}$=$h_{B3}$=90 degrees (FIG. 15A to H)

Figure 15A:
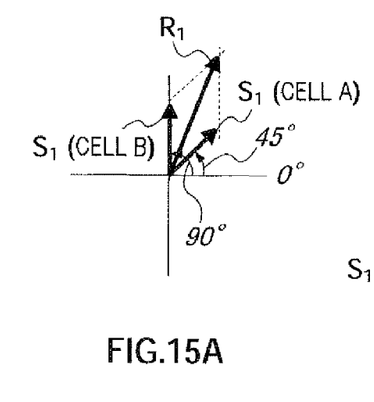
FIG. 15 shows a received symbol according to an embodiment of the present invention.

Given that $h_{A1}$=45 degrees and $h_{B1}$=90 degrees, the phase of $S_1$ in cell A (FIG. 10) rotates 45 degrees in the channel and the phase of $S_1$ in cell B (FIG. 11) rotates 90 degrees in the channel. In this way, $S_1$ in cell A and $S_1$ in cell B are combined in channels, so that received symbol $R_1$ is as shown in FIG. 15A.

Figure 15B:
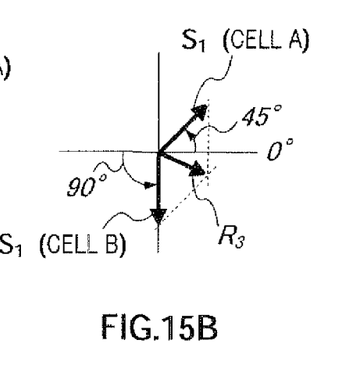

Given that $h_{A3}$=45 degrees and $h_{B3}$=90 degrees, the phase of $S_1$' in cell A (FIG. 10) rotates 45 degrees in the channel and the phase of $S_1$' in cell B (FIG. 11) rotates 90 degrees in the channel. In this way, $S_1$' in cell A and $S_1$' in cell B are combined in channels, so that received symbol $R_3$ is as shown in FIG. 15B.

Figure 15C:
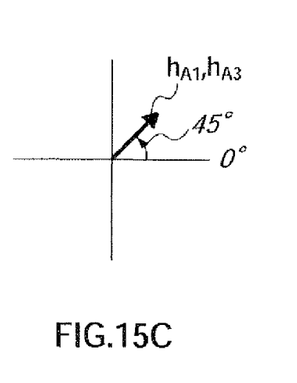
Figure 15D:
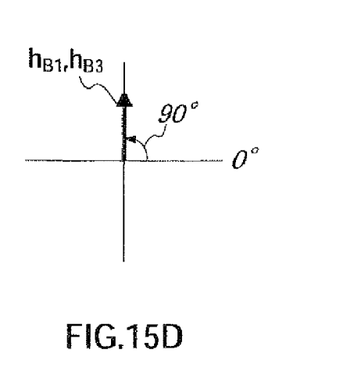

On the other hand, channel estimation values resulting from channel estimation in channel compensating section 205 are $h_{A1}$=$h_{A3}$=45 degrees and $h_{B1}$=$h_{B3}$=90 degrees as shown in FIG. 15C and FIG. 15D.

Figure 15E:
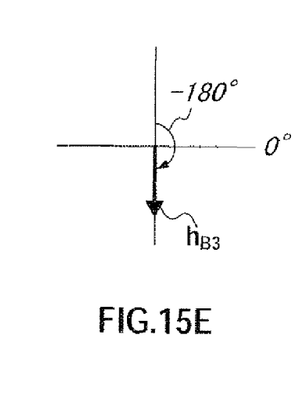

According to $\phi_{B3}$=180 degrees, channel compensating section 205 carries out processing to reverse the phase of $h_B3$ in FIG. 15D 180 degrees as shown in FIG. 15E. This processing makes $h_{B3}$=270 degrees.

Figure 15F:
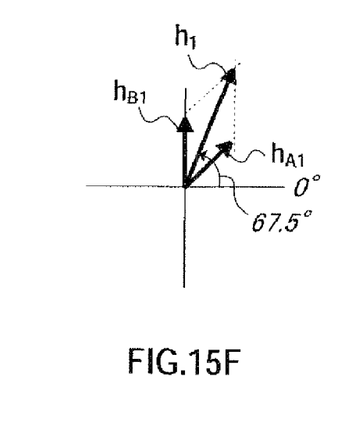
Figure 15G:
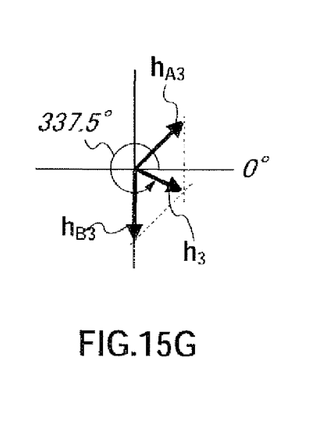

Next, channel compensating section 205 finds combined channel estimation value $h_1$ in subcarrier $f_1$ by combining $h_{A1}$ and $h_{B1}$ as shown in FIG. 15F, to find the channel estimation value for $R_1$ obtained by combining $S_1$ in cell A and $S_1$ in cell B. In this way, $h_1$=67.5 degrees. In the same way, channel compensating section 205 finds combined channel estimation value $h_3$ in subcarrier $f_3$ by combining $h_{A3}$ and $h_{B3}$ after the phase is reversed, as shown in FIG. 15G, to find the channel estimation value for $R_3$ obtained by combining $S_1$' in cell A and $S_1$' in cell B. In this way, $h_3$=337.5 degrees.

Figure 15H:
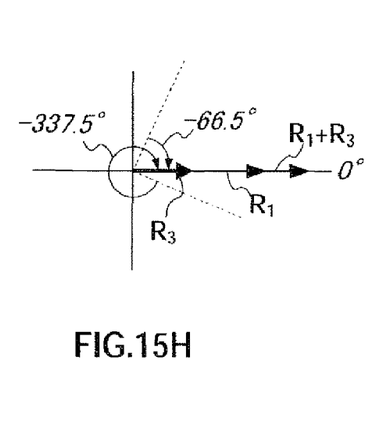

Next, as shown in FIG. 15H, channel compensating section 205 compensates for the channel variation in $R_1$ based on $h_1$ and compensates for the channel variation in $R_3$ based on $h_3$. That is, channel compensating section 205 carries out processing to reverse the phase of $R_1$ 66.5 degrees and the phase of $R_3$ 337.5 degrees.

Then, as shown in FIG. 15H, combining section 207 combines $R_1$ and $R_3$ after compensation for the channel variation and acquires the combined symbol $R_1$+$R_3$.

In this way, $\Delta\phi_A$=0 degree and $\Delta\phi_B$=180 degrees, so that it is possible to prevent $S_1$ and $S_1$' in cell A and $S_1$ and $S_1$' in cell B from being received by mobile station MS with out of phase, as in cases of above (1) and (2).

As is clear from the above description, $\Delta\phi_A \ne \Delta\phi_B$, so that, even when $S_1$ and $S_1$' are influenced by the phase variation in the channels, it is possible to prevent the received power of both $R_1$ and $R_3$ from decreasing to zero in the mobile station and prevent $R_1$ and $R_3$ from being lost, and obtain diversity gain resulting from combination of $S_1$ and $S_1$', and, consequently, prevent degradation of received performances.

It is preferable to maximize the phase rotation differences between adjacent cells to minimize degradation of received performances due to cancellation between $S_1$s and between $S_1$'s.

For example, in the two-cell model shown in FIG. 1, it is preferable to make the difference between the phase rotation difference $\Delta\phi_A$ in cell A and the phase rotation difference $\Delta\phi_B$ in cell B 180 degrees, as described above.

Figure 16:
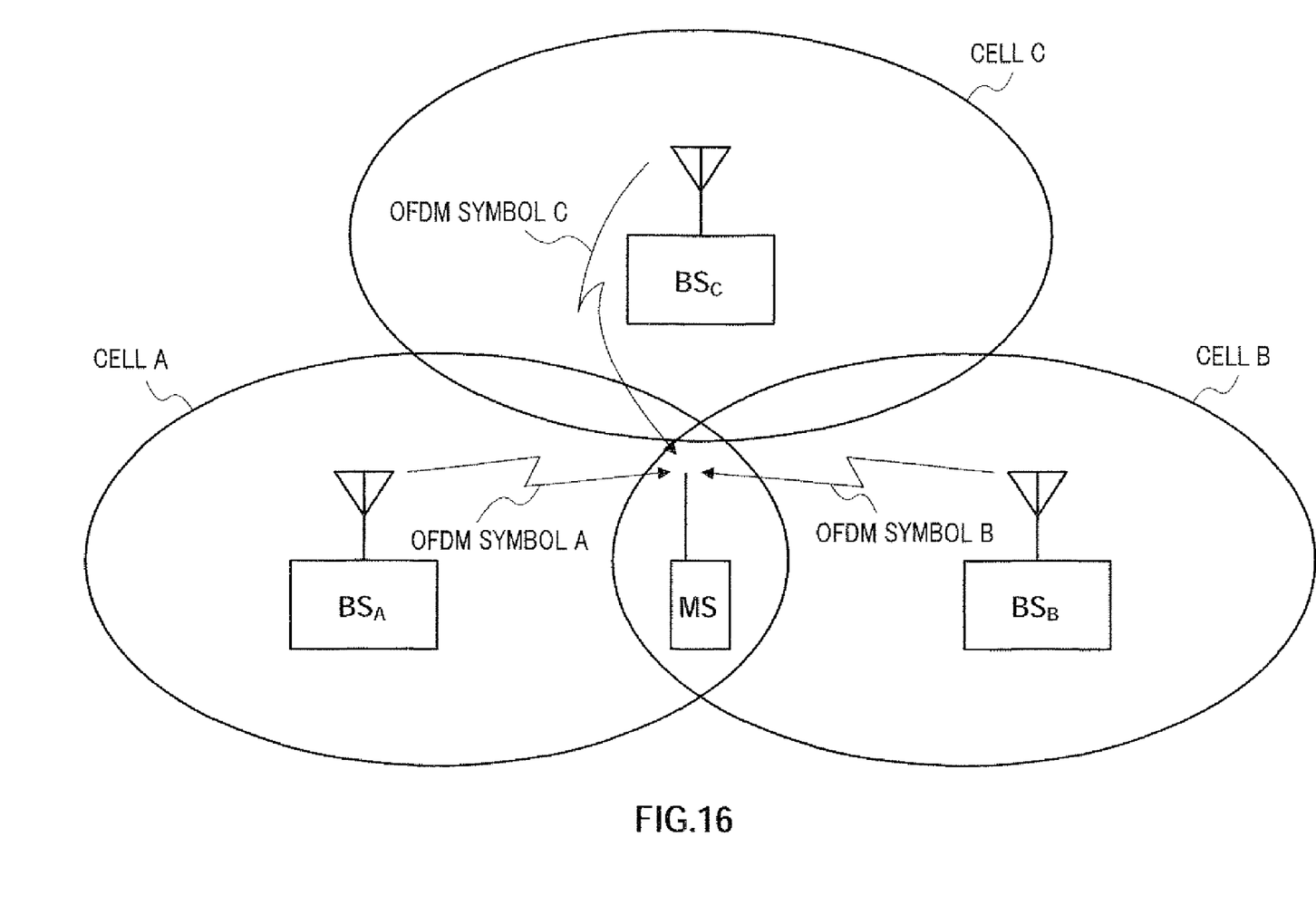
FIG. 16 shows cell arrangement according to an embodiment of the present invention (three-cell model)
Figure 17:
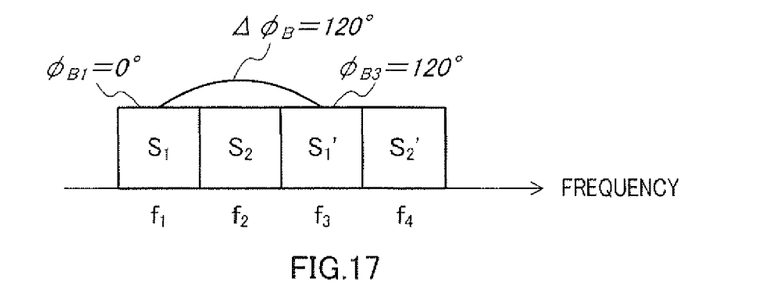
FIG. 17 illustrates phase rotation according to an embodiment of the present invention (cell B)
Figure 18:
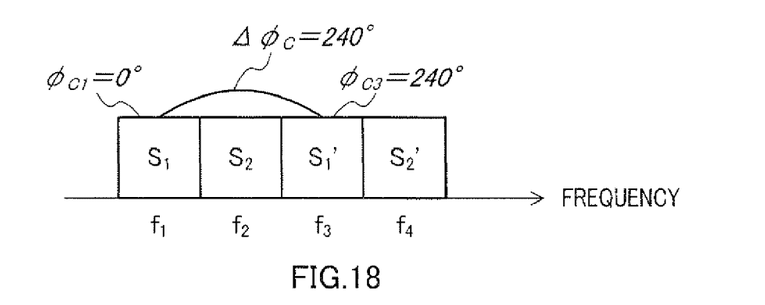
FIG. 18 illustrates phase rotation according to an embodiment of the present invention (cell C)

Further, in the three-cell model shown in FIG. 16 it is preferable to make the differences between the phase rotation difference $\Delta\phi_A$ in cell A, the phase rotation difference $\Delta\phi_B$ in cell B, and the phase rotation difference $\Delta\phi_C$ in cell C, all 120 degrees. Consequently, for example, in cases where the phase rotation ($\Delta\phi_A$=0 degree assuming that $\phi_{A1}$=0 degree and $\phi_{A3}$=0 degree) as shown in FIG. 8 is applied in cell A, it is preferable that $\Delta\phi_B$=120 degrees assuming that $\phi_{B1}$=0 degree and $\phi_{B3}$=120 degrees in cell B as shown in FIG. 17 and $\Delta\phi_C$=240 degrees assuming that $\phi_{C1}$=0 degree and $\phi_{C3}$=240 degrees in cell C as shown in FIG. 18.

In this way, with the present embodiment, base stations in cells adjacent to each other make the phase rotation difference between $S_1$ and $S_1$' a value matching the number of adjacent cells. For example, in the two-cell model shown in FIG. 1, there is one cell, B cell, adjacent to cell A and, in the three-cell model shown in FIG. 16, there are two cells adjacent to one cell, so that each base station applies phase rotations $\phi_1$ and $\phi_3$ that produce the phase rotation difference $\Delta\phi$ according to equation (1), to $S_1$ and $S_1$'. For example, in the two-cell model, by changing n in equation (1) to n=0 or 1, base station $BS_A$ applies phase rotations $\phi_{A1}$ and $\phi_{A3}$ that produce a phase rotation difference $\Delta\phi_A$ in case of n=0, to $S_1$ and $S_1$' and base station $BS_B$ applies phase rotations $\phi_{B1}$ and $\phi_{B3}$ that produce a phase rotation difference $\Delta\phi_B$ in case of n=1, to $S_1$ and $S_1$'. Further, in the three-cell model, by changing n in equation (1) to n=0, 1 or 2, base station $BS_A$ applies phase rotations $\phi_{A1}$ and $\phi_{A3}$ that produce a phase rotation difference $\Delta\phi_A$ in case of n=0, to $S_1$ and $S_1$', base station $BS_B$ applies phase rotations $\phi_{B1}$ and $\phi_{B3}$ that produce a phase rotation difference $\Delta\phi_B$ in case of n=1, to $S_1$ and $S_1$' and base station $BS_C$ applies phase rotations $\phi_{C1}$ and $\phi_{C3}$ that produce a phase rotation difference $\Delta\phi_C$ in case of n=2, to $S_1$ and $S_1$'.

$$\text{Phase rotation difference}=n \times (360 \text{ degrees})/(\text{number of adjacent cells}+1), \text{ where n is an integer} \quad \text{(Equation 1)}$$

Figure 19:
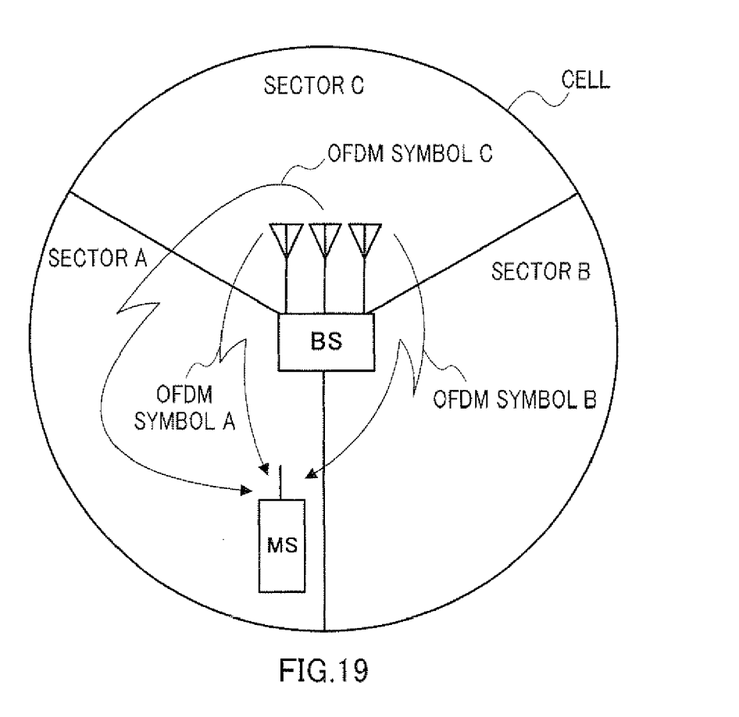
FIG. 19 shows sector arrangement according to an embodiment of the present invention (three-sector model)

Further, although a case has been described with the above description where the present invention is implemented between adjacent cells, the present invention can be implemented as described above even between adjacent sectors in the same cell. For example, in the three-sector model shown in FIG. 19, the present invention can be implemented as in the three-cell model shown in FIG. 16. That is, assuming that cell A is sector A, cell B is sector B and cell C is sector C in the above description, the present invention can be implemented as described above. However, in cases where the present invention is implemented between adjacent sectors, base station BS shown in FIG. 19 makes the phase rotation difference between $S_1$ and $S_1'$ a value matching the number of sectors in one cell. That is, base station BS applies phase rotations $\phi_1$ and $\phi_3$ that produce the phase rotation difference $\Delta\phi$ according to equation (2), to $S_1$ and $S_1'$ in each sector. To be more specific, in the three-sector model shown in FIG. 19, given that the number of sectors in one cell is "3," by changing n in equation (2) to n=0, 1 or 2, phase rotations $\phi_{A1}$ and $\phi_{A3}$ that produce a phase rotation difference $\Delta\phi_A$ in case of n=0, are applied to $S_1$ and $S_1'$ in sector A, phase rotations $\phi_{B1}$ and $\phi_{B3}$ that produce a phase rotation difference $\Delta\phi_B$ in case of n=1, are applied to $S_1$ and $S_1'$ in sector B and phase rotations $\phi_{C1}$ and $\phi_{C3}$ that produce a phase rotation difference $\Delta\phi_C$ in case of n=2, are applied to $S_1$ and $S_1'$ in sector C. By so doing, it is possible to minimize degradation of received performances due to cancellation between $S_1$s and between $S_1'$s by maximizing the phase rotation differences between adjacent sectors.

Phase rotation difference=$n \times$(360 degrees/number of sectors in one cell), where n is an integer (Equation 2)

Figure 20:
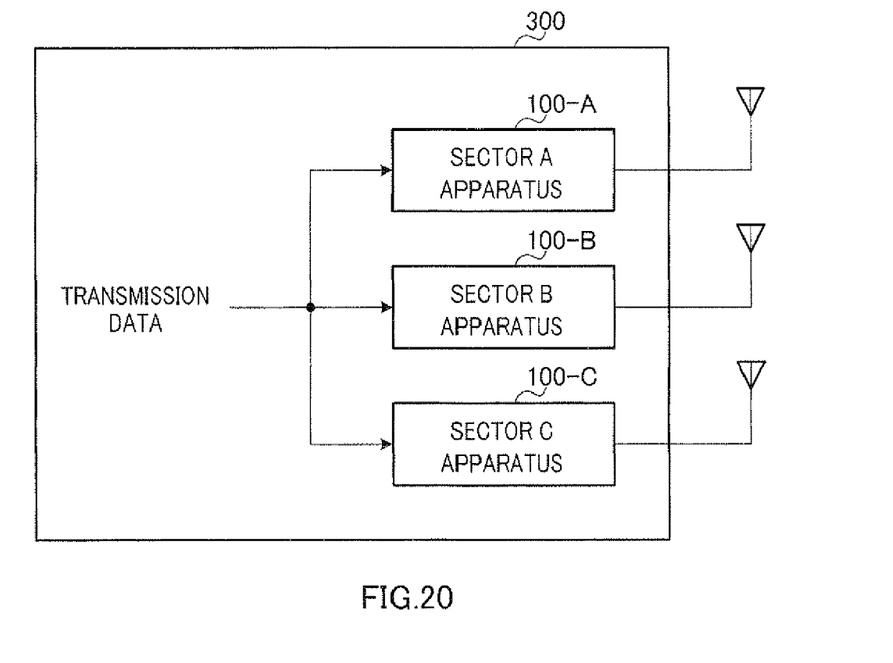
FIG. 20 is a block diagram showing a configuration of the base station according to an embodiment of the present invention (three-sector model)

Further, FIG. 20 shows the configuration of base station BS of FIG. 19 as base station 300. Base station 300 has sector A apparatus 100-A, sector B apparatus 100-B and sector C apparatus 100-C that each have the same configuration. Sector A apparatus 100-A, sector B apparatus 100-B and sector C apparatus 100-C each have the same configuration as base station 100 shown in FIG. 4 and receive as input the same transmission data.

An embodiment of the present invention has been described above.

Figure 21:
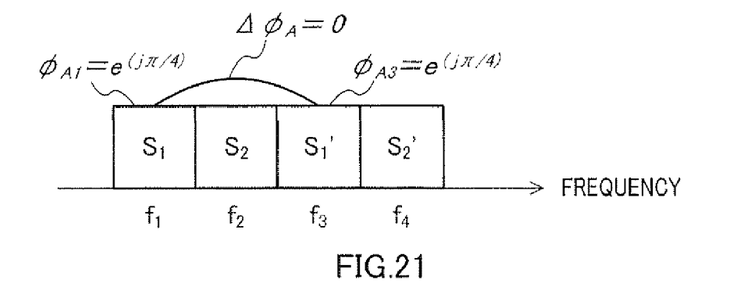
FIG. 21 illustrates phase rotation according to an embodiment of the present invention (cell A)
Figure 22:
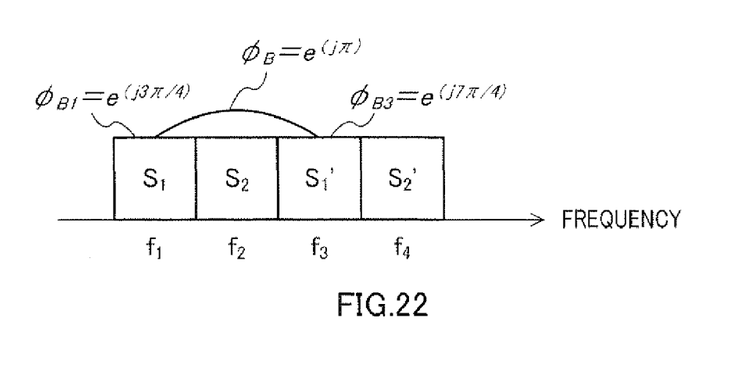
FIG. 22 illustrates phase rotation according to an embodiment of the present invention (cell B).

Further, the phase rotation may be applied in the base station to $S_1$ and $S_1'$ by multiplying $S_1$ and $S_1'$ by $e^{(j\theta)}$. For example, in a case where the phase rotation difference in cell A is $\Delta\phi_A$=0, the phase rotation difference in cell B is $\Delta\phi_B = e^{(j\pi)}$, and the difference between $\Delta\phi_A$ and $\Delta\phi_B$ is $e^{(j\pi)}$ (that is, 180 degrees), $e^{(j\pi/4)}$ is multiplied upon $S_1$ and $S_1'$ in cell A as shown in FIG. 21 and $e^{(j3\pi/4)}$ is multiplied upon $S_1$ and $e^{(j7\pi/4)}$ is multiplied upon $S_1'$ in cell B as shown in FIG. 22. Further, the phase rotation applied using this multiplication may be performed by multiplying cell-specific or sector-specific scrambling sequences comprised of $e^{(j\theta)}$ sequence. Furthermore, in cases where the cell-specific or sector-specific scrambling sequences comprised of $e^{(j\theta)}$ sequence are determined in advance and cannot be changed, the scrambling sequences may be multiplied by changing the arrangement of data symbols according to the scrambling sequence so as to produce the desired phase rotation difference. Still further, in cases where the scrambling sequence has been multiplied upon $S_1$ and $S_1'$, the phase rotation may be applied by further multiplying $e^{(j\theta)}$ upon $S_1$ and $S_1'$.

The degree of phase rotation applied to each data symbol may be known in advance between the base station and the mobile station or may be reported from the base station to the mobile station. For example, the degree of phase rotation may be reported as control information each time the OFDM symbol is transmitted.

Further, although a case has been described with the above description as an example where two same data symbols can be acquired assuming that the repetition factor (RF) in repetition section 103 is RF=2, the present invention is not limited to RF=2 and may be applied to the case where RF is three or more.

Furthermore, although a case has been described with the above description where the present invention is applied to downlink, the present invention can be applied to uplink. It is possible to apply the present invention to uplink by, for example, providing a plurality of transmitting apparatuses in a mobile station, carrying out the same processing in a plurality of transmitting apparatuses as in base stations 100 and 300 and carrying out the same processing in the base station as in above mobile station 200.

Further, although a case has been described with the above description where the channel estimation value in cell A is found from the pilot in cell A, the channel estimation value in cell B is found from the pilot in cell B, and then the combined channel estimation value is found by combining these channel estimation values, the combined channel estimation value may be found by the following method. That is, the base station may apply the phase rotation with the same angle as the data symbol to the pilot in cell A and the pilot in cell B and transmit these pilots to the mobile station at the same time, by the same frequency, and the mobile station may find the combined channel estimation value directly from the combined received pilot in the channel.

Further, although a case has been described with the above description where the present invention is implemented for symbols arranged on the frequency axis (i.e. frequency domain), the present invention can be also implemented as described above for symbols arranged on the time axis (i.e. time domain).

Although OFDM has been described with the above description as an example of multicarrier communication, the present invention can be implemented in multicarrier communication other than OFDM.

Further, the base station, mobile station and subcarrier may be referred to as "Node B," "UE" and "tone," respectively. Furthermore, a CP may be referred to as "guard interval (GI)."

Also, although cases have been described with the above embodiments as examples where the present invention is configured by hardware, the present invention can also be realized by software.

Each function block employed in the description of the above embodiment may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2006-128258, filed on May 2, 2006, including the specification, drawings and abstract, is incorporated herein by reference in its entirety.

INDUSTRIAL APPLICABILITY

The present invention is applicable to, for example, a mobile communication system.

The invention claimed is:

1. A radio communication base station apparatus that transmits a multicarrier signal comprised of a plurality of subcarriers to a radio communication mobile station apparatus, the radio communication base station apparatus comprising:
- a repetition section that repeats a first symbol to generate a plurality of same first symbols;
- a phase rotation section that applies a phase rotation to the plurality of first symbols; and
- a transmitting section that transmits the multicarrier signal in which the plurality of first symbols given phase rotations are allocated to the plurality of subcarriers, wherein
- the phase rotation section makes a phase rotation difference between the plurality of first symbols different from a phase rotation difference between a plurality of second symbols which are the same as the plurality of first symbols and which are transmitted in a different cell or a different sector at the same time, by the same frequency, as the plurality of first symbols.

2. The radio communication base station apparatus according to claim 1, wherein the phase rotation section applies the phase rotation that produces a phase rotation difference matching a number of different cells or different sectors.

3. The radio communication base station apparatus according to claim 1, wherein the phase rotation section applies the phase rotation that produces a phase rotation difference represented by n×(360 degrees/(number of different cells+1)) or a phase rotation difference represented by n×(360 degrees/number of sectors in one cell), where n is an integer.

4. The radio communication base station apparatus according to claim 1, wherein the phase rotation section makes the phase rotation difference between the plurality of first symbols different from a phase rotation difference between the plurality of second symbols by multiplying the plurality of first symbols by a scrambling code that applies phase rotation that produces a phase rotation difference different from the phase rotation difference between the plurality of second symbols, to the plurality of first symbols.

5. A radio communication method used in a radio communication system where same symbols are transmitted at the same time, by the same frequency between a plurality of cells or between a plurality of sectors, the radio communication method comprising making a phase rotation difference between of the same symbols in a first cell or a first sector different from a phase rotation difference between the same symbols in a second cell, different from the first cell, or a second sector, different from the first sector.

* * * * *